United States Patent [19]
Prillinger et al.

[11] 3,901,556
[45] Aug. 26, 1975

[54] VEHICLE BRAKE CONTROL SYSTEM HAVING A PLURALITY OF MASTER CYLINDERS WHICH ARE SEPARATELY ACTUATABLE FOR DIFFERENT BRAKING OPERATIONS WHILE BEING JOINTLY ACTUATABLE FOR EMERGENCY BRAKING

[75] Inventors: Peter F. M. Prillinger, Peoria Heights; Paul C. Rosenberger; Alfred W. Sieving, both of Decatur, all of Ill.

[73] Assignee: Caterpillar Tractor Company, Peoria, Ill.

[22] Filed: Mar. 14, 1974

[21] Appl. No.: 450,974

[52] U.S. Cl. .................. 303/13; 188/345; 303/2; 303/6 R
[51] Int. Cl.² ................ B60T 15/16; B60T 11/00
[58] Field of Search ............... 303/13, 9, 2, 7, 6 R; 188/345; 60/581; 340/60

[56] References Cited
UNITED STATES PATENTS

| | | | |
|---|---|---|---|
| 3,228,729 | 1/1966 | Schubert | 303/9 |
| 3,237,995 | 3/1966 | Dobrikin | 303/9 |
| 3,294,455 | 12/1966 | Valentine | 303/13 |
| 3,456,988 | 7/1969 | Gibbons et al. | 303/13 |
| 3,503,655 | 3/1970 | Heimler | 303/2 X |
| 3,601,451 | 8/1971 | Cummins et al. | 303/13 |
| 3,631,389 | 12/1971 | Elliot | 340/60 |
| 3,650,568 | 3/1972 | Poplawski | 303/2 |
| 3,765,729 | 10/1973 | Toumey | 303/13 |

Primary Examiner—Trygve M. Blix
Assistant Examiner—Douglas C. Butler
Attorney, Agent, or Firm—Phillips, Moore, Weissenberger Lempio & Strabala

[57] ABSTRACT

Dual master cylinders are arranged to apply hydraulic pressure to a single set of vehicle brakes through a double check valve and single brake fluid conduit. A first of the master cylinders is actuated by compressed air in response to manipulation of an operator's service brake control, while the second master cylinder is actuated to a lesser extent by compressed air responsive to an operator's retarder control. A modulatable emergency brake control may independently and simultaneously actuate both master cylinders together with a third master cylinder coupled to separate brakes. Thus, braking capacity remains available if the service brake system or the retarder brake system or both should fail, or if the emergency system should itself fail while either the service system or the retarder system remains functional. Upon a significant lowering of emergency system air pressure, a warning is given to the operator who may then initiate controlled emergency braking until the air pressure reaches a predetermined minimum at which point all three master cylinders are automatically actuated and the brakes cannot be released until emergency system operating pressure is restored. Alarm devices are present to warn of incipient failure of other parts of the system, and a control are provided for optionally inactivating a portion of the vehicle brakes when not needed which controls is overrideable by the emergency system described above. Further devices speed response of the system to actuation and release of brake controls and provide for rapid automatic purging of air from the hydraulic portion of the system.

9 Claims, 2 Drawing Figures

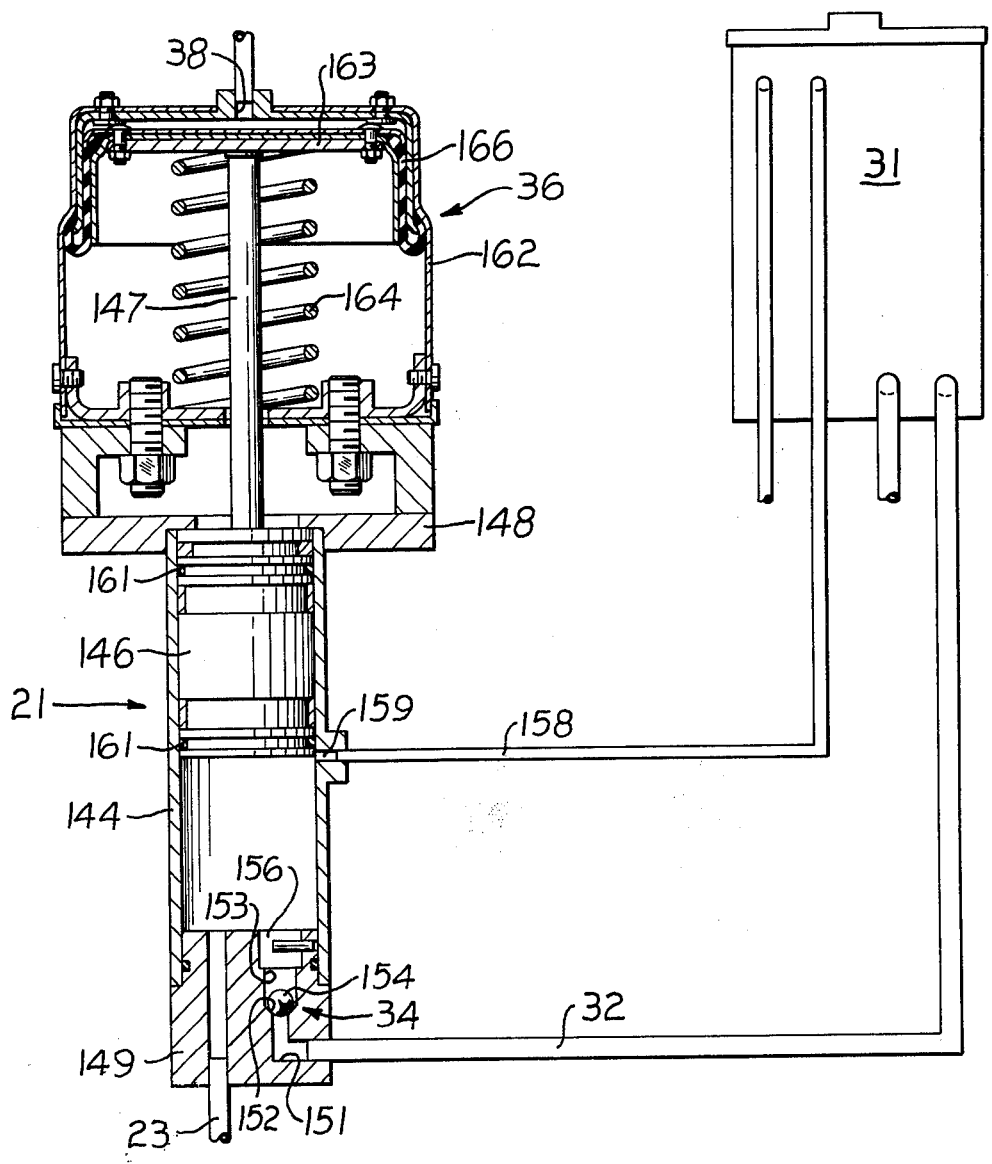

VEHICLE BRAKE CONTROL SYSTEM HAVING A PLURALITY OF MASTER CYLINDERS WHICH ARE SEPARATELY ACTUATABLE FOR DIFFERENT BRAKING OPERATIONS WHILE BEING JOINTLY ACTUATABLE FOR EMERGENCY BRAKING

BACKGROUND OF THE INVENTION

This invention relates to vehicle brake control systems and more particularly to control systems for brakes of the kind which are actuated by the application of fluid pressures thereto.

A common form of vehicle braking system employs a master cylinder which may be operated to transmit a fluid pressure to individual brakes at the vehicle wheels for the purpose of applying the brakes. While the master cylinder is operated through mechanical linkages in some systems, heavy vehicles such as trucks or earthmoving apparatus often have a pneumatic circuit for actuating the master cylinder in response to manipulation of an operator's brake control. Typically, a service tank of compressed air may be communicated with the master cylinder through a relay valve in response to a fluid pressure signal originating at the operator's service brake pedal or the like.

Failure of the braking system in a vehicle can be extremely hazardous and thus it is customary to supplement the service braking system with an emergency brake system. In some cases, the emergency brake may be completely independent of the service braking system. In other vehicles a separate emergency compressed air tank is provided which, upon actuation of an emergency brake control, supplies pressure to the same master cylinder that provides service braking. Heavy vehicles may also be equipped with a retarder braking system which partially actuates the master cylinder in response to setting of an operator's retarder control, the degree of braking provided by the retarder system being less than that of the service or emergency system so that the usual effect is to slow motion of the vehicle for travelling down a slope or the like rather than fully stopping the vehicle.

The redundancy provided by the existence of both a service braking system and an emergency braking system and in some cases a retarder braking system substantially reduces the hazards inherent in potential brake failure. However, if the emergency braking system is of the form which is completely independent from the service braking system, considerable complexity and cost are added to the overall system in order to provide a function which in practice may rarely be utilized. If the emergency system is of the form which acts through the same master cylinder that is utilized in the service braking system, then there is no protection against malfunction of the master cylinder itself.

Considering now another aspect of such braking systems, it is customary to provide some means to warn the operator of the vehicle if the pressure within a service or emergency compressed air tank approaches a minimum safe operating level. Prior U.S. Pat. No. 3,601,451 discloses a braking system which provides still more positive protection in that the emergency braking system is automatically activated if the pressure within the emergency tank has dropped to a predetermined minimum safe value because of prolonged continued use of the emergency system or some other cause. Once the emergency system is actuated in this manner it cannot be released until the pressure within the emergency tank has been restored to a normal operating level. Thus, in the system of prior U.S. Pat. No. 3,601,451, sudden braking can occur unexpectedly insofar as the operator is concerned. While this is fundamentally a valuable safety measure, it can also complicate the operator's task. If conditions permit, the operator would generally prefer to bring the vehicle to a more controlled emergency stop by modulated controllable braking rather than by suddenly having the brakes locked on and out of manual control.

Considering still another aspect of braking systems of this general type, response of the brakes to application and release of the operator's braking controls should be very rapid to avoid unwanted lockup of the wheels with consequent tire wear and a risk of skidding. Leakage of air into the hydraulic lines between the master cylinder and brakes is one example of a factor which can slow response, and delayed restoring of a master cylinder after operation is another. The need to move large quantities of hydraulic fluid and air also slows response. Prior braking systems have in general been characterized by undesirably slow response at least under some conditions.

SUMMARY OF THE INVENTION

This invention provides a vehicle braking system having improved reliability while providing for a plurality of different modes of braking action with a minimum of system complication. A first pair of master cylinders are utilized to apply hydraulic pressure to the same brakes through a double check valve and single conduit in an arrangement where only one of the two master cylinders is normally employed for one mode of braking such as service braking, while the other master cylinder alternately provides a second mode of braking such as retarding braking, but the emergency brake system energizes both master cylinders. Thus, braking capability remains in the presence of failure of the service braking control system or failure of the retarding braking control system or failure of both, or in the event of failure of the emergency braking control system provided it is unaccompanied by failure of both of the other braking systems. Braking capacity also remains if one of the master cylinders itself should fail.

Further, in a preferred form of the invention, still another master cylinder provides for optional use of additional brakes on others of the vehicle wheels in the service braking mode, but such additional master cylinder is always actuated by the emergency brake system.

Thus, braking capability is always available as long as components associated with one of the three braking systems remain operable and as long as at least one of three master cylinders remains functional, but the cost and complications of utilizing completely redundant independent braking systems for safety purposes is avoided in that all master cylinders and the control components therefor have useful functions additional to that of providing reserve braking capacity for emergencies.

In one form of the invention the emergency braking system is energized automatically in the event that the emergency system air supply should drop to a predetermined minimum pressure. However, unexpected stopping of the vehicle is avoided. Prior to this occurrence, a warning is given to the operator when service braking system air pressure is insufficient, indicating a need to rely on emergency braking. A second warning is then given if the emergency system pressure drops near the level at which automatic braking occurs so that a controlled modulated stop may be made. Further, system response is enhanced by automatic means for purging any leakage air in the hydraulic portion of the system and by provisions which assure fast refill of master cylinders following each application of the brakes.

Accordingly, it is an objet of this invention to provide a highly dependable braking system for a vehicle which provides for a plurality of different modes of braking wherein individual components are utilizable in more than one such mode of braking.

It is another object of this invention to provide a vehicle braking system in which brakes are automatically applied in the event of a significant drop of emergency braking air pressure but in which the operator is enabled to perform at least one controlled modulated stop of the vehicle prior to such emergency actuation.

It is still another object of the invention to provide a vehicle braking system having extremely fast response to the actuation and deactuation of braking controls.

The invention, together with further objects and advantages thereof, will best be understood by reference to the following description of a preferred embodiment taken in conjunction with the accompanying drawings.

BRIEF DESCRIPTION OF THE DRAWINGS

In the accompanying drawings:

FIG. 2 is a view of a portion of the system of FIG. 1 wherein certain components are shown in section to illustrate the mechanical construction thereof.

DESCRIPTION OF A PREFERRED EMBODIMENT

Figure 1:
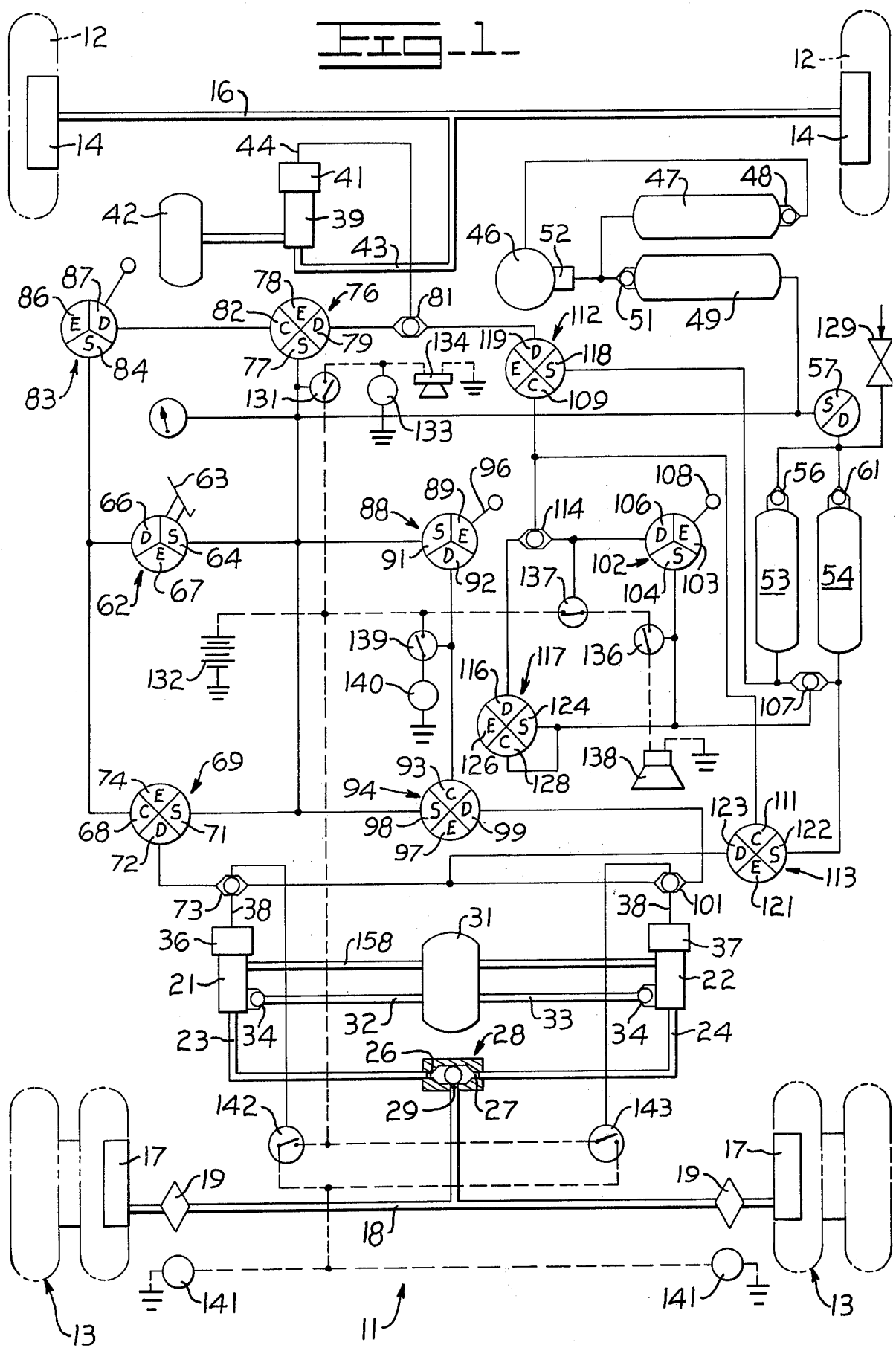
FIG. 1 is a schematic diagram of a vehicle braking system in accordance with the invention.

Referring initially to FIG. 1 of the drawing, a braking system 11 in accordance with the invention is shown as adapted for a truck vehicle or the like of the form having a pair of front wheels 12 and two sets of dual rear wheels 13, it being understood that the system is equally applicable to a wide variety of other types of vehicle. Each of the front wheels 12 is provided with a conventional brake 14 of the known form which is applied by transmitting pressurized hydraulic fluid to the brake through a front wheel brake conduit 16 and each of the sets 13 of dual rear wheels is provided with a similar brake 17 which is applied by hydraulic pressure received through a rear wheel brake conduit 18. Slack adjusters 19 of known form are preferably disposed between conduit 18 and each rear brake 17 to maintain proper brake adjustment and to minimize master cylinder stroke to assure that a maximum reserve of hydraulic fluid and air is present. Accordingly, the front wheels brake 14 may be applied by pressurizing the hydraulic fluid within conduit 16 while the rear wheel brakes 17 may be applied by pressurizing conduit 18 and relief of the pressure in either conduit will release the associated brakes.

Conduit 18 may be pressurized to apply the rear brakes 17 by a service brake master cylinder 21 or alternately by a retarder brake master cylinder 22 or both depending on operational conditions as will hereinafter by described in more detail. Master cylinders 21 and 22 have hydraulic pressure output conduits 23 and 24 respectively which communicate with separate inlets 26 and 27 respectively of a double check valve 28 which has an outlet 29 communicated with rear brake conduit 18. Check valve 28 is of the form in which fluid pressure from either of inlets 26 and 27 is transmitted to the outlet 29 depending on which inlet receives the highest pressure, but which blocks passage of fluid from one inlet to the other. Accordingly, actuation of either or both of the master cylinders 21 and 22 acts to apply the rear brakes 17. Any loss of fluid from either master cylinder 21 and 22 through leakage or other causes is replaced from a makeup tank 31 containing a suitable hydraulic fluid, such as oil, through makeup conduits 32 and 33 respectively, and each master cylinder has a check valve 34 to block reverse flow from the master cylinder back to the makeup tank through such conduits.

The master cylinders 21 and 22, which will hereinafter be described in more detail, are of the form having actuator means 36 and 37 respectively which actuate the associated master cylinder in response to receipt of compressed air at an inlet 38.

A front brake master cylinder 39 having an actuator 41 and a hydraulic fluid makeup tank 42 has an outlet conduit 43 communicated with front brake conduit 16 whereby actuation of the master cylinder pressurizes conduit 16 to apply the front brakes 14. Actuator 41 operates the front master cylinder 39 in response to receipt of compressed air at an actuator inlet 44.

High pressure air for operating the above described master cylinder actuators 36, 37 and 41 is provided by an air compressor 46 which initially transmits the compressed air to a wet tank 47 through a check valve 48 wherein any condensation water produced by the compression process is trapped. Wet tank 47 is in turn communicated with a service tank 49 through another check valve 51 which maintains pressure in the service tank when the compressor 46 is not operating, or in the event of compressor malfunction. A conventional pressure control 52 responsive to the pressure in the wet tank 47 may be provided to temporarily inactivate the compressor when the system pressure is within an acceptable operating range.

To assure braking capability in the event of pressure loss in the service tank 49, a front emergency air tank 53 and a rear emergency air tank 54 are also provided, two such emergency tanks being present to further assure braking capability in the event of malfunction of either the front or rear braking system. Front emergency tank 53 receives air from service tank 49 through a one-way check valve 56 which blocks return flow and through a pressure protection valve 57 of known form which isolates the emergency tank from the service tank if service tank pressure drops below a predetermined value. Rear emergency tank 54 also receives pressure from service tank 49 through an additional check valve 61 and the pressure protection valve 57. Check valves 56 and 61 in conjunction with pressure protection valve 57 prevent any loss of pressure from the emergency tanks 53 and 54 if the pressure in the service tank 49 drops below a safe level and also prevents interchange of air between the two emergency tanks 53 and 54.

The system 11 provides for five distinct modes of braking. This includes service braking using the rear wheel brakes 17 only, this being the normal braking mode employed by the operator to slow or stop the vehicle under ordinary circumstances. A second mode is service braking utilizing both the front and rear brakes 14 and 17 respectively, and is employed when the vehicle is heavily loaded or travelling over steep terrain wherein maximum braking capacity may be required. A third mode consists of retarder braking wherein the rear brakes 17 are relatively lightly applied to slow motion of the vehicle when travelling down a slope. The fourth braking mode is manually modulated emergency braking which may be initiated by the operator upon being made aware of a failure in the service or retarding braking system. The fifth braking mode is automatic emergency braking which is initiated by the system independently of the operator if the pressure within both emergency tanks 53 and 54 drops to a predetermined minimum safe level.

Considering now the control components primarily involved in the rear wheel service braking mode of operation, a manually operated service brake valve 62 is controlled, in this example, by a brake pedal 63 and is of the form having a supply port 64 coupled to service tank 49 and which further has a delivery port 66 and exhaust port 67. Valve 62 normally blocks communication between the supply port 64 and delivery port 66 while venting the delivery port to the exhaust port 67 but upon depression of pedal 63 the delivery port is increasingly isolated from the exhaust port and increasingly communicated with the supply port in proportion to the amount of pedal depression to receive selectable pressure from service tank 49. Delivery port 66 communicates with a control port 68 of a service relay valve 69. The service relay valve 69 is of the known form having a supply port 71 which is coupled to service tank 49, a delivery port 72 coupled to inlet 38 of master cylinder actuator 36 through a double check valve 73, and an exhaust port 74. With control port 68 unpressurized, delivery port 72 is vented through the exhaust port 74 while supply port 71 is closed. Upon pressurization of the control port 68, exhaust port 74 is increasingly closed and supply port 71 is communicated with delivery port 72 to a degree proportional to the pressure applied to the control port. Accordingly, upon operation of brake pedal 63, valve 62 transmits control pressure to relay valve 72 which then supplies pressure from service tank 49 to actuator 36 causing master cylinder 21 to be actuated to apply the rear brakes 17 to a selected degree, the brake actuation being modulatable by control of the brake pedal 63.

To provide the second mode of service braking wherein both the front and rear brakes are utilized, a front brake relay valve 76 has a supply port 77 communicated with service tank 49, an exhaust port 78, a delivery port 79 communicated with front master cylinder actuator inlet 44 through a double check valve 81, and further has a control port 82. Thus, upon pressurization of control port 82, valve 76 delivers pressure from service tank 49 to front master cylinder actuator 41 to apply the front brakes 14. To enable the operator to optionally utilize the front brakes 14 for service braking, a manually operable front brake cutout valve 83 has a supply port 84 coupled to the delivery port of valve 62, an exhaust port 86 and further has a delivery port 87 connected to the control port 82 of front brake relay valve 76. In the OFF position, valve 83 blocks supply port 84 while communicating delivery port 87 to exhaust port 86 thereby inactivating the front service brake relay valve 76 so that operation of brake pedal 63 does not initiate application of the front brakes 14.

Upon being manually shifted to the ON position, the valve 83 isolates delivery port 87 from exhaust port 86 while communicating the supply port 84 to the delivery port. In this ON position, front service brake relay 76 is operated simultaneously with operation of the rear service brake relay 69 and operation of the brake pedal 63 causes both the front and rear brakes to be applied.

Considering now the retarding mode of braking operation, a manually operable retarder valve 88 has an exhaust port 89, a supply port 91 coupled to service tank 49 and a delivery port 92 communicated with a control port 93 of a retarder relay valve 94. In the OFF position, retarder control valve 88 blocks supply port 91 while communicating delivery port 92 to exhaust port 89. Upon being shifted to the retarding mode position, valve 88 isolates delivery port 92 from exhaust 89 while communicating supply port 91 to the delivery port in an amount proportional to the positioning of the valve control lever 96.

Retarder relay valve 94 has an exhaust port 97, a supply port 98 communicated with service tank 49 and a delivery port 99 communicated with inlet 38 of retarder master cylinder actuator 37 through a double check valve 101. With control port 93 unpressurized, retarder relay valve supply port 98 is blocked while delivery port 99 is vented to exhaust port 97. Upon pressurization of the control port 93, air from supply port 98 is transmitted to delivery port 99 to initiate actuation of the retarder master cylinder 22 in an amount proportional to such pressurization. Thus, by setting the retarder control lever 96, the operator may cause the rear brakes 17 to be continually applied for the purpose of slowing motion of the vehicle while traveling down a slope. To realize this retarding function, as contrasted with full braking, retarder relay valve 94 is proportioned so that the maximum outlet pressure which can be transmitted to the retarder master cylinder actuator 37 through valve 94 is limited to about two-thirds of the full pressure available for service braking.

The manually controlled emergency braking mode of operation is initiated with a manually operated emergency valve 102 which is lever operated in this example and which has an exhaust port 103, a supply port 104 and a delivery port 106. Supply port 104 is coupled to both emergency tanks 53 and 54 through a double check valve 107. Owing to the double check valve 107, the supply port 104 receives air from the particular one of the emergency tanks 53 and 54 which has the highest pressure at any given time. In the unoperated position of valve 102, the supply port 104 is blocked while the delivery port 106 is communicated with exhaust port 103. Upon manual actuation of emergency valve 102, delivery port 106 is blocked from exhaust port 103 and increasingly communicated with supply port 102 as a function of the position of the control lever 108. Delivery port 106 is communicated with control ports 109 and 111 of front and rear emergency relay valves 112 and 113 respectively through a three-way check valve 114 which blocks reverse air flow towards the valve 102. Check valve 114 is also connected with the delivery port 116 of an inversion valve 117 to enable the relay valves 112 and 113 to be actuated by compressed air delivered from either the manually operated emergency valve 102 or the inversion valve or both as will hereinafter be described in more detail.

The supply port 118 of front emergency relay valve 112 is coupled to front emergency tank 53 while the delivery port 119 is coupled to the actuator inlet 44 of front master cylinder 39 through the previously described double check valve 81. Accordingly, upon actuation of the emergency brake control valve 102, pilot pressure received at control port 109 of front emergency relay valve 112 causes air pressure from tank 53 to be delivered to actuator 41 in an amount proportional to the positioning of control lever 108 and thereby applies the front brakes 14 to the extent desired by the operator. It should be observed that the double check valve 81 causes the front brakes 14 to be applied during the emergency braking mode regardless of the position of the cut out valve 83 which enables the operator to inactivate the front brakes during routine service braking. Actuator 41 may receive air pressure from either of the relay valve 76 and 112 but only relay valve 76 is affected by the position of the front brake cut out valve 83.

As previously described, operation of the emergency brake lever 108 also applies air pressure to control port 111 of rear emergency relay valve 113. Valve 113 has an exhaust port 121, a supply port 122 communicated with rear emergency air tank 54 and a delivery port 123 communicated with inlets 38 of both rear master cylinder actuators 36 and 37 through the previously described double check valves 73 and 101 respectively. It has been previously pointed out that the double check valves 73 and 101 function during service braking and the retarding braking modes to cause only one of the two rear master cylinders 21 and 22 to be actuated at any given time. It should be observed that this is not true of the emergency braking mode of operation in which both the rear master cylinders 21 and 22 are simultaneously actuated and, moreover, full actuation pressure may be applied to the retarding master cylinder 22 in contrast to what occurs during the retarding mode of operation. This arrangement adds substantially to safety in that under the normal non-emergency conditions, one of the two rear master cylinders 21 and 22 is always unactuated at any given time and thus is available as reserve braking capacity in the event that the other rear master cylinder has bottomed out from oil leakage or has malfunctioned.

The final mode of braking operation is automatic emergency braking which is initiated by the inversion valve 117 when the air pressure in both emergency tanks 53 and 54 has dropped to some predetermined level at which sufficient air pressure is available for only a small number of emergency stops. The inversion valve 117 is connected in parallel with the manually operated emergency control valve 102 to pressurize the control ports 109 and 111 of both emergency relay valves 112 and 113 respectively under the above described condition. For this purpose, the invention valve has a supply port 124 connected to the emergency tanks 53 and 54 through the previously described double check valve 107 to receive pressure from whichever of the two tanks has the highest air pressure at a given time. Inversion valve 117 further has an exhaust port 126 and a delivery port 116 connected to the control ports of the emergency relay valves 112 and 113 through the previously described check valve 114. The inversion valve 117 may be of known construction in which the control port 128 is connected to the supply port 124 and in which a pressure above a predetermined minimum safe level at the control port 128 shifts the valve to vent the delivery port 116 through exhaust port 126 while blocking supply port 124. Upon dropping of the pressure at control port 128 below the predetermined minimum level, the delivery port is isolated from the exhaust port and communicated with the supply port to energize the emergency relay valves 112 and 113. All brakes 14 and 17 are thereby locked in the applied condition and it may be observed that the brakes cannot be released by any manipulation of the operator's manual brake controls. Release of the brakes following automatic application can only be accomplished by restoring the pressure in at least one of the emergency tanks 53 and 54 to the level at which the inversion valve 117 shifts back to the original condition. A charging valve 129 is provided for connecting an external air compressor, pump, or compressed air tank to emergency tanks 53 and 54 through check valves 56 and 71 to enable such recharging to be accomplished by external means if the vehicle compressor 46 is not functioning.

An unexpected locking of the brakes of the vehicle in the automatic emergency mode is preferable from the safety standpoint to an unknown complete loss of braking capacity, but nevertheless it is preferable that one of the other braking modes be used to stop the vehicle in a controlled and intentional manner. Accordingly, warning means are provided to alert the operator of various conditions which may precede automatic emergency braking. A normally closed first pressure switch 131 is coupled to the service tank 49 whereby the switch is opened as shown in FIG. 1 as long as the pressure in service tank 49 is safely above a minimum safe level. Switch 131 is connected between the vehicle battery 132 and a warning lamp 133 and an audible alarm 134 to energize both the lamp and the alarm when the service tank 49 pressure drops to the point at which the service braking system can no longer be relied upon. This alerts the operator to the fact that it may be necessary to utilize the emergency braking system to stop the vehicle and to the fact that only a limited number of manually controlled modulated applications of the emergency brake system may be possible before the automatic emergency braking system stops the vehicle. Under most conditions, the operator should at this point bring the vehicle to a controlled stop with the emergency lever 108 and initiate repairs of the cause of the loss of pressure in the service tank 49. Should he continue to operate the vehicle relying on the manually operated emergency control lever 108 for any length of time, the automatic emergency braking mode will eventually be activated as described above to force stopping of the vehicle.

To further avoid unnecessary activation of the automatic emergency system, two additional pressure switches 136 and 137 and another alarm device such as an audible horn 138 are connected in series between battery 132 and vehicle ground. Pressure switch 36 is coupled to the emergency tanks 53 and 54 through double check valve 107 to be held open as long as the pressure in either tank remains at a level substantially above that at which the automatic emergency application of the brakes occurs. Thus, warning horn 138 will not sound as long as at least one of the emergency tank pressures remains high enough to permit at least one voluntary modulated emergency stop using the hand lever 108. When the tank pressure drops to the point that possibly only one such controlled stop may be made before automatic emergency stopping occurs, switch 136 closes. If switch 137 is also closed at that time, this energizes horn 138 to warn the operator the available pressure may provide for only one voluntary modulated stop using the control lever 108. The other pressure switch 137 is coupled to delivery port 106 of manually operated emergency valve 102 to enable the operator to silence horn 138 upon taking the preferred action of stopping the vehicle in a modulated voluntary manner by actuation of hand lever 108. Thus, upon manipulation of the emergency brake lever 108 to the actuated position, switch 137 is pressurized and opens to stop horn 138.

To guard against inadvertent actuation of the brakes in the retarding mode without the operator being aware of that fact, an additional warning lamp 140 is connected between battery 132 and vehicle ground in series with a normally open pressure switch 139. Switch 139 is coupled to the control port 93 of retarding system relay valve 94 so that it is closed and lamp 140 is energized whenever the control port 93 is pressurized to activate the retarding mode of brake operation. A pair of brake lights 141 are provided at the rear of the vehicle to alert a following vehicle when the brakes are applied in any mode. For this purpose, lights 141 are both connected between battery 132 and vehicle ground through pressure switches 142 and 143 which are connected in parallel relationship between the batteries and both brake lights. Pressure switch 142 is coupled to inlet 38 of master cylinder 21 through double check valve 73 to be closed whenever master cylinder 21 is actuated while pressure switch 143 is coupled to inlet 138 of the other rear master cylinder 22 through check valve 101 to the closed whenever master cylinder 22 is actuated. Owing to the parallel relationship of the two pressure switches 142 and 143, energization of either or both of the master cylinders 21 and 22 lights both brake lights 141.

Response of the system to application and release of the brakes can be enhanced by proportioning the components which establish a flow passage between the tanks 49, 53 and 54 and master cylinder actuators 36, 37 and 41 to provide a sizeable flow path for quick admission and release of fluid at the actuators. FIG. 2 illustrates the construction of a representative one of the actuators 36 and master cylinders 21 in more detail and illustrates further provisions for enhancing speed of response of the system. Master cylinder 21 may consist of an upright cylindrical housing 144 having a piston 146 slideable therein, the piston being attached to a piston rod 147 which extends through a cylinder endwall 148 into actuator 36. The opposite end of housing 144 has a closure 149 through which the previously described conduit 23 to the rear brakes communicates with the interior of the housing. The previously described conduit 32 from make-up tank 31 also communicates with the interior of housing 144 through closure 149 and more particularly through the check valve 34 which is situated therein. Check valve 34 has a specific construction designed to enhance response of the braking system by providing for extremely rapid refill of the cylinder 21 with hydraulic fluid upon retraction of the piston 146 away from closure 149 following an application of the brakes. In particular, conduit 32 from make-up tank 31 communicates with a passage 151 in closure 149 in which an annular valve seat 152 is formed, the larger diameter side of the valve seat being communicated with housing 144 by an additional passage 156 which is of substantially larger diameter than the valve seat. A spherical valve element or ball 154 is disposed in passage 153 to contact valve seat 152, thereby blocking the flow back towards make-up tank 31, when piston 146 is advanced toward closure 149 to apply the brakes. Upon retraction of the piston 146 away from closure 149 to release the brakes, ball 154 may lift from seat 152 to enable make-up fluid to be drawn into housing 144 from tank 131. The relatively large diameter of passage 156 prevents ball 154 from impeding the flow of make-up fluid into housing 144. Thus, when ball 154 lifts from seat 152, an unrestricted passage is provided to the interior of the housing 144. By situating the make-up tank an appropriate distance above the level of check valve 34, sufficient pressure head may be developed in conduit 32 to enable ball 154 to lift from its seat 152 in response to any slight negative pressure within the housing 144 produced by retraction of piston 146 away from closure 149 without a compensating return of oil from brake conduit 23 due to fluid leakage during brake activation.

To automatically purge any entrapped air from the oil volume within housing 144, a breather conduit 158 communicates a small breather port 159 in the wall of cylinder 144 with the upper end of make-up tank 31, the breather port 159 being located to be exposed to the oil volume within housing 144 only after piston 146 has reached the maximum degree of retraction from closure 149, an annular seal 161 being disposed around the piston in position to pass over the breather port 159 just prior to full retraction of the piston. Accordingly, when the system is first filled with hydraulic fluid, air entrapped within housing 144 may return to make-up tank 31 as the hydraulic fluid rises within the cylinder and the hydraulic fluid subsequently rises above the breather port 159 so that an air free volume of oil is present between the piston 146 and the conduit 23.

The actuator 36 may have a cylindrical housing 162 coaxial with cylinder housing 144 and the piston rod 147. A circular disk 163 is secured to the end of piston rod 147 within housing 162 and a compression spring 164 is disposed coaxially around the piston rod to bear against disk 163 and thereby urge piston 146 of master cylinder 121 away from closure 149. To force piston 146 towards closure 149 to apply the brakes in response to air pressure received at inlet 38 as previously described, a flexible annular diaphragm 166 extends between the periphery of disk 163 and the interior of housing 162. Thus, a build-up of air pressure in the housing 162 between disk 163 and inlet 38 forces piston rod 147 and piston 146 towards closure 149 against the force of spring 164 and release of such air pressure enables the spring to return the piston.

While the invention has been described with respect to a single preferred embodiment, it will be apparent that many variations are possible and it is not intended to limit the invention except as defined by the following claims.

What is claimed is:

1. A brake control system for a vehicle which has at least a first brake means that is applied by transmitting hydraulic pressure thereto, comprising:
 first and second master cylinders each having an outlet and each having an actuator means for generating hydraulic pressure at said outlet thereof in response to a brake signal, a first check valve connected to said first brake means and to both of said first and second master cylinder outlets and having valve means for transmitting hydraulic pressure to said first brake means from the one of said outlets which has the higher pressure thereat while blocking direct communication between said outlets, manually controllable service brake signal generating means coupled to said first master cylinder actuator means for selectively applying said first brake means by actuation of said first master cylinder without actuation of said second master cylinder, a manually controllable second brake signal generating means coupled to said second master cylinder actuator means for selectively applying said first brake means by actuation of said second master cylinder without actuation of said first master cylinder, and an emergency brake signal generating means coupled to both said first and said second master cylinders for simultaneously actuating both of said master cylinders to apply hydraulic pressure to said first brake means through said first check valve.

2. The combination defined in claim 1 wherein said manually controllable second brake signal generating means is a retarding brake signal generating means which applies a maximum hydraulic pressure to said first brake means which is less than the maximum hydraulic pressure which may be applied to said first brake means by actuation of said first master cylinder.

3. A brake control system for a vehicle which has at least a first brake means that is applied by transmitting hydraulic pressure thereto, comprising:

first and second master cylinders each having an outlet and each having an actuator means for generating hydraulic pressure at said outlet thereof in response to a braking signal, a first check valve connected to said first brake means and to both of said first and second master cylinder outlets and having valve means for transmitting hydraulic pressure to said first brake means from the one of said outlets which has the higher pressure thereat while blocking direct communication between said outlets, manually controllable service brake signal generating means coupled to said first master cylinder actuator means for selectively applying said first brake means by actuation of said first master cylinder without actuation of said second master cylinder, and an emergency brake signal generating means coupled to both said first and said second master cylinders for simultaneously actuating both of said master cylinders to apply hydraulic pressure to said first brake means through said first check valve, wherein said emergency brake signal generating means comprises a first emergency tank of compressed gas, emergency relay valve means coupled between said first emergency tank and said first and second master cylinder actuator means for applying gas pressure thereto to actuate said first and second master cylinders, manually controllable means for selectively causing said emergency relay valve means to apply said gas pressure to said first and second master cylinder actuator means, and an inversion valve means coupled to said first emergency air tank and having means for applying gas pressure to both of said master cylinder actuator means independently of said manually controllable means after the gas pressure within said first emergency tank drops to a first predetermined value.

4. The combination defined in claim 3 wherein said vehicle has second brake means which are applied by transmitting hydraulic pressure thereto, said combination further comprising a third master cylinder having a hydraulic pressure outlet communicated with said second brake means and having actuator means for generating hydraulic pressure thereat in response to a braking signal, manually controlled cut off means having an open position at which said third master cylinder actuator means is actuated by service brake signal generating means concurrent with actuation of said first master cylinder thereby and having a closed position at which said third master cylinder actuator means is unresponsive to said service brake signal generating means, and emergency means for actuating said third master cylinder actuator means simultaneously with emergency actuation of said first and second master cylinders irrespective of the position of said cut off means.

5. The combination defined in claim 4 further comprising a second emergency tank of compressed gas and wherein said emergency means for actuating said third master cylinder actuator means supplied compressed gas thereto from said second emergency tank, and wherein said inversion valve means for applying gas pressure to said first and second master cylinder actuator means from said first emergency tank and for applying gas pressure to said third master cylinder actuator means from said second emergency tank only when the pressure within both of said emergency tanks is below said first predetermined value.

6. The combination defined in claim 3 further comprising a first warning device, and actuating means for energizing said first warning device in response to a drop of pressure in said first emergency tank to a second predetermined value which is greater than said first predetermined value.

7. The combination defined in claim 6 further comprising means for maintaining said first warning device deactivated while said manually controllable means is actuated.

8. A brake control system for a vehicle having hydraulic pressure actuated front wheel brakes and rear wheel brakes, comprising:

a front master cylinder coupled to said front wheel brakes and having an actuator for applying hydraulic pressure thereto in response to an air pressure signal, a first check valve having an outlet coupled to said rear wheel brakes and having a pair of hydraulic fluid inlets together with means for communicating said outlet with the one of said inlets having the highest fluid pressure thereat while blocking direct communication between said inlets, a service master cylinder coupled to a first of said inlets of said first check valve and having an actuator for applying hydraulic pressure thereto in response to an air pressure signal, a retarder master cylinder coupled to the other of said inlets of said first check valve and having an actuator for applying hydraulic pressure thereto in response to an air pressure signal, a service braking compressed air tank, a front brake emergency compressed air tank, and a rear brake emergency compressed air tank, a service braking relay valve connected between said service braking tank and said service master cylinder and having a control port and means for transmitting air from said service tank to said service master cylinder actuator in response to pressurization of said control port, a manually operable service brake valve connected between said service tank and said control port of said service braking relay valve for selectively pressurizing said control port thereof, a retarder braking relay valve connected between said service tank and said retarder master cylinder and having a control port and means for transmitting air from said service tank to said retarder master cylinder actuator in response to pressurization of said control port, a manually operable retarder brake valve connected between said service tank and said control port of said retarder braking relay valve for selectively pressurizing said control port thereof, a front brake relay valve connected between said service tank and said front master cylinder and having a control port and means for transmitting air from said service tank to said front master cylinder actuator in response to pressurization of said control port, a manually operable cut-off valve connected between said control ports of said front brake relay valve and said service braking relay valve and having an open position and a closed position, a front emergency relay valve connected between said front emergency tank and said front master cylinder actuator independently of said front brake valve and having a control port and means for transmitting air from said front emergency tank to said front master cylinder actuator in response to pressurization of said control port, a rear emergency relay valve connected between said rear emergency tank and both of said service master cylinder actuator and said retarder master cylinder actuator independently of said service relay valve and said retarder relay valve and having a control port and means for transmitting air from said rear emergency tank to said service master cylinder actuator and said retarder master cylinder actuator in response to pressurization of said control port, a manually operable emergency brake valve connected between said front and rear emergency tanks and said control ports of said front and rear emergency relay valves for selectively pressurizing said control ports thereof, and inversion valve means connected between said front and rear emergency tanks and said control ports of said front and rear emergency relay valves independently of said manually operable emergency brake valve and having means for pressurizing said control ports of said front and rear emergency relay valves when the pressure in both of said front and rear emergency tanks drops to a predetermined value.

9. The combination defined in claim 8 further comprising first warning means activated by a drop of pressure in said service tank to a predetermined value indicative of a need to rely on said emergency braking means, a second warning device activated by a drop of pressure in both said front and rear emergency tanks to a second predetermined value which is above that at which said inversion valve means pressurizes said control ports of said front and rear emergency relays, and means for maintaining said second warning device inactive while said manually operable emergency brake valve is actuated.

* * * * *